Oct. 20, 1942.  E. P. SEXTON  2,299,430
CONTROL DEVICE
Filed Jan. 30, 1941
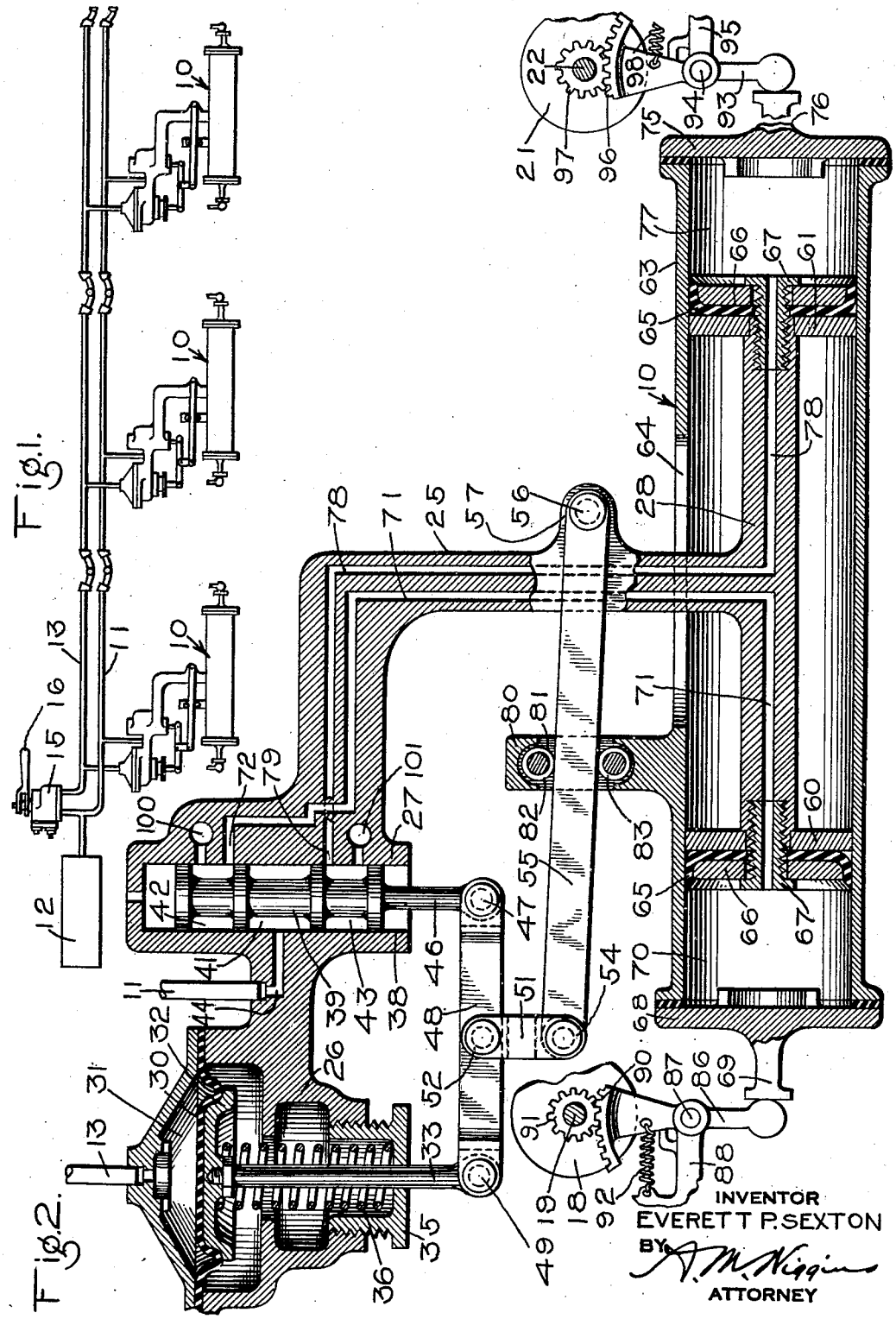
INVENTOR
EVERETT P. SEXTON
BY
*A. M. Higgins*
ATTORNEY Patented Oct. 20, 1942

2,299,430

UNITED STATES PATENT OFFICE 2,299,430

CONTROL DEVICE

Everett P. Sexton, East McKeesport, Pa., assignor to The Westinghouse Air Brake Company, Wilmerding, Pa., a corporation of Pennsylvania Application January 30, 1941, Serial No. 376,623

1 Claim. (Cl. 121—41)

This invention relates to railway vehicle controlling equipments, and more particularly to a fluid pressure responsive apparatus for controlling both propulsion and braking of a vehicle.

In order to provide adequate high speed transit service in large metropolitan areas, provision has been made for operation of trains made up of vehicles individually equipped with driving motors and braking apparatus, together with actuator apparatus by means of which the driving and the braking equipments of all the vehicles in the train may be operated simultaneously by a motorman stationed in the leading vehicle. To insure ease of operation of a train of vehicles so equipped, it is desirable to provide means on each vehicle which is operative in accordance with variations in the pressure of fluid in a control pipe to actuate either the brake controlling means or the propulsion controlling means of the vehicle in predetermined increments or steps, the movement of the actuator mechanism of any one vehicle in the train being exactly the same as that of the similar apparatus on the other vehicles. A brake and propulsion control actuator designed to provide the features of operation just mentioned is disclosed and broadly claimed in the U. S. Patent 2,215,355 issued May 9, 1940, to Ellis E. Hewitt, which patent has been assigned to the assignee of the present application.

The principal object of the present invention is to provide an improved propulsion and braking control actuator device which may be employed in a train system of the above type, and which comprises a fluid pressure operated member movable in one direction for operating a propulsion controller and in the opposite direction for operating a brake controller, and balanced valve means of novel design constructed and arranged to control movement of said member in accordance with variations in a control pressure.

Other objects and advantages of the invention will appear in the following description thereof, taken in connection with the accompanying drawing, wherein Fig. 1 is a schematic view of a brake and propulsion control system for a plurality of vehicles, including controlling actuator devices constructed in accordance with the invention, and Fig. 2 is a diagrammatic sectional view illustrating in enlarged detail a single brake and propulsion control actuator of the type shown in Fig. 1.

Referring to Fig. 1, the train control system embodying my invention may comprise a plurality of braking and propulsion actuator devices 10, each of which is mounted on one of the vehicles of the train in operative association with the usual brake controller and propulsion controller thereof, a supply pipe 11 extending throughout the train and connected with the reservoir 12 carried on the leading vehicle, and a control pipe 13, which also extends throughout the train and is normally charged with fluid at a predetermined pressure that may be increased or reduced at will by operation of a motorman's control valve device 15. The control valve device 15 may be of any suitable design, and is preferably of the self-lapping type operable to maintain a fluid pressure in the control pipe 13 corresponding with the position of a handle 16. As is hereinafter more fully explained, the control valve device is operable to increase the pressure of fluid in the control pipe above the normal pressure when it is desired to effect propulsion of the train, and to reduce the control pipe pressure when it is desired to cause an application of the brakes.

Referring to Fig. 2, the control equipment adapted to be carried by each vehicle includes the actuator device 10, a propulsion controller 18 having a rotary operating shaft 19, and a brake controller 21 having a similar operating shaft 22. It will be understood that the propulsion controller 18, which is not illustrated in detail in the drawing, may be of any desired type comprising a suitable circuit controlling mechanism operative to regulate the operation of the usual driving motors of the vehicle in accordance with the angle through which the shaft 19 is rotated. The brake controller 21 is likewise illustrated only in outline form and may have any suitable construction operative to control application and release of the usual vehicle brakes in accordance with the movement of the rotary shaft 22, and may, for example, be of the type shown in the U. S. Patent 2,112,423 issued to Joseph C. McCune on March 29, 1938, and assigned to the assignee of the present invention. Both the propulsion controller 18 and the brake controller 21 may be mounted on the vehicle by suitable means, not shown, and according to the present embodiment of the invention are preferably disposed on opposite sides of the actuator device 10.

The actuator device 10 comprises a casing structure which is adapted to be mounted on the vehicle by suitable means such as bolts, not shown, and includes a control portion 26, a valve portion 27, and a neck portion 25, which terminates in a T-shaped carrier portion 28. Mounted in the control portion 26 of the casing structure is a flexible diaphragm 30, at one side of which is formed a pressure chamber 31 communicating with the control pipe 13. The opposite side of the diaphragm 30 is engaged by a pilot or follower element 32 to which is secured a stem 33, the lower end of which extends through an aperture formed in a spring seat element 35 having screw-threaded connection with the control portion 26 of the casing structure. A coil spring 36 is interposed between the inner wall of the spring seat element and the follower member 32 for exerting a force against the diaphragm 30 in opposition to the pressure of fluid in the chamber 31.

Formed in the valve portion 27 of the casing structure is a bore 38, in which is slidably mounted a balanced slide valve member 39, which is preferably disposed substantially parallel to the rod 33. The slide valve element 39 is provided with suitable annular channels forming a central supply chamber 41 and two discharge chambers 42 and 43 disposed at opposite sides thereof. The supply channel 41 at all times communicates by way of a passage 44 with the supply pipe 11. Formed on one end of the slide valve element 39 is a stem 46, which extends downwardly and outwardly of the bore 38, and carries a pin 47 to which is pivotally secured one end of a lever 48, the other end of which is similarly connected to a pin 49 carried by the stem 33. It will be understood that the pivotal connection between the lever 48 and pins 47 and 49 is such as will prevent any binding effect during operation thereof as hereinafter explained.

Associated with the lever 48 is a fulcrum link 51 which is pivotally connected to the lever by means of a pin 52 disposed intermediate the pins 49 and 47. The lower end of the fulcrum link 51 is pivotally connected to a pin 54 mounted on the outer end of a lever 55, the other end of which is pivotally anchored on a pin 56 carried by a portion 57 of a casing structure.

The carrier portion 28 of the casing structure may be substantially tubular in form and comprises oppositely extending arms on the ends of which are mounted disk shaped abutments 60 and 61, respectively. The carrier portion 28 is adapted to be disposed within a movable cylinder 63, the inner wall of which is in sliding engagement with the two abutments 60 and 61 as shown in the drawing. An elongated aperture 64 is formed in the wall of the cylinder 63 for permitting the carrier portion 28 of the casing structure to be introduced into the cylinder when the mechanism is assembled, it being understood that the abutments 60 and 61 may then be applied to the ends of the carrier portion by way of the open ends of the cylinder. Each of the abutments 60 and 61 is preferably provided with a suitable packing gasket 65, which is held in place by a washer 66 and bolt 67.

Bolted or otherwise secured to the end of the cylinder 63 adjacent the abutment 60 is a cylinder head 68, which has an outwardly projecting boss 69, and is adapted to close a pressure chamber 70 formed in the cylinder at the outer side of the abutment. The pressure chamber 70 communicates by way of a passage 71 formed in the abutment 60 and in the neck portion 25 of the casing structure, with a port 72 formed in the wall of the bore 38 containing the slide valve element 39. In like manner a cylinder head 75 having a central boss 76 is suitably secured to the opposite end of the cylinder 63 for closing a chamber 77 that is formed at the outer side of the abutment 61. The pressure chamber 77 communicates by way of a passage 78 extending through the casing structure with a port 79, which, like the port 72, opens into the bore 38.

According to the invention, the cylinder 63 is constructed and arranged for controlling operation of the slide valve element 39, and for this purpose the cylinder carries a laterally extending arm portion 80, which has a centrally disposed recess 81 adapted to receive the lever 55. A pair of rollers 82 and 83 are suitably journaled within the recess 81 of the arm portion 80, and are disposed in operative engagement with opposite sides of the lever 55. It will be noted that the lever 55, with the various elements of the apparatus disposed in their normal positions as shown in the drawing, is somewhat canted with respect to the cylinder 63, so that upon movement of the latter member in either direction one or the other of the rollers 82 and 83 will exert an operating force against the lever in a corresponding direction.

The boss 69 carried by the cylinder head 68 is operatively aligned with one end of an operating element 86, which is journaled intermediate its ends on a shaft 87 mounted on a stationary bracket 88 carried by the vehicle. The end of the operating element 86 opposite that adjacent the boss 69 has formed thereon a rack portion 90, having a plurality of teeth which operatively engage the teeth of a pinion 91 secured to the rotary shaft 19 of the propulsion controller 18. A spring 92 is preferably connected to the operating element 86 and to a lug formed on the bracket member 88 for urging the operating element into the normal position shown in the drawing.

For operating the brake controller 21 there is provided an operating element 93, which is journaled intermediate the ends thereof on a pin 94 carried by a bracket member 95, the lower end of the operating element being operatively aligned with the boss 76 and the upper end having a toothed rack portion 96 in operative engagement with the pinion 97 of the brake controller. A spring 98 is provided for maintaining the operating element 93 in its normal position, in which the brake controller 21 is held in brake release position.

*Operation*

When the brake and propulsion control system is initially conditioned for operation, the supply pipe 11 becomes charged with fluid under the pressure maintained in the main reservoir 12, while the control valve device 15 of the leading vehicle is disposed in a coasting position for supplying fluid under pressure to the control pipe 13, the fluid pressure in the latter pipe being normally maintained at the predetermined value already mentioned.

Referring to Fig. 2 when the pressure of fluid in the control pipe 13 and in diaphragm chamber 31 of the actuator device 10 is thus initially increased to the normal value, the diaphragm 30 and follower member 32 are moved downwardly in opposition to the force exerted by the spring 36 and assume the intermediate position shown in the drawing, while the lever 48 and valve element 39 are at the same time disposed in the normal positions shown. The valve element 39 is now held in its normal or coasting position, wherein the channel 42 maintains communication between the port 72 and an atmospheric exhaust port 100, while the channel 43 connects the port 79 with a similar exhaust port 101. It will be noted that the supply pipe 11 at this time communicates only with the intermediate channel 41 of the valve member. Since the chambers 70 and 77 within the movable cylinder 63 are thus connected with the atmosphere by way of the respective passages 71 and 78, the cylinder is maintained in its intermediate position shown in Fig. 2, due to the fact that each of the springs 92 and 98 associated with the propulsion and brake controllers is at this time effective to maintain the associated operating element 86 or 93 in a substantially vertical position. It will also be understood that the propulsion controller 18 is disposed in its power-off position, while the brake controller 21 is held in brake release position.

In order to effect operation of the driving motors for the purpose of propelling the vehicle, the control valve device 15 on the leading vehicle is operated so as to cause an increase in the pressure of fluid in control pipe 13 above the normal pressure. Upon the consequent increase in the pressure of fluid in the diaphragm chamber 31 of the actuator device 10 on each of the vehicles of the train, the diaphragm 30 and stem 33 are forced downwardly against the pressure of the spring 36, thereby turning the lever 48 in a counterclockwise direction about the pin 52 for moving the slide valve member 39 upwardly, as viewed in Fig. 2. The slide valve member 39 first cuts off communication between the port 72 and the atmosphere and then establishes communication between that port and the supply channel 41, whereupon fluid under pressure is supplied therefrom by way of the passage 71 to the chamber 70 within the cylinder 63.

The pressure of fluid thus supplied to the chamber 70 acts against the inner surface of the cylinder head 68 with sufficient force to move the cylinder 63 to the left, as viewed in Fig. 2, causing the boss 69 to turn the operating element 86 about the shaft 87 for operating the propulsion controller 18, it being understood that the usual rotary switch mechanism included therein is thereby actuated to complete suitable circuits, not shown, effecting operation of the propulsion motors in the usual manner.

The rate of operation of the vehicle propulsion motors is of course determined by the degree of movement of the propulsion controller 18, and consequently in accordance with the distance traversed by the movable cylinder 63 under the pressure of fluid admitted to the chamber 70. As the cylinder 63 is shifted to the left as just explained, the roller 82 carried by the arm portion of the cylinder is moved along the initially canted lever 55, and exerts a downward pull thereon which is transmitted through the medium of the fulcrum link 51 to the lever 48, causing operation thereof about the pin 49 to draw the valve member 39 downwardly into lap position. It will be apparent that this operation of the lever 48 and valve member 39 is accomplished without alteration of the position of the diaphragm stem 33. Upon movement of the valve member 39 to lap position, communication between the channel 41 and the port 72 is cut off, further flow of fluid under pressure to the chamber 70 within the movable cylinder 63 ceases, and movement of the cylinder and elements associated therewith is consequently stopped, it being understood that the positions now occupied by the cylinder and other elements, including the propulsion controller 18, now correspond to the control pipe pressure established in the diaphragm chamber 31.

Since all of the actuator devices 10 on the vehicles of the train shown in Fig. 1 are adapted to respond in exactly the same manner to the increase in control pipe pressure as just explained, the propulsion motors throughout the train are operated at a substantially uniform rate, according to the will of the motorman operating the control valve device of the leading vehicle. It will be evident that the speed of the train may be increased or decreased as desired by controlling the pressure of fluid in the control pipe 13 through the medium of the control valve device, each of the several actuator devices being adapted to respond quickly to each variation in control pipe pressure for effecting corresponding operation of the propulsion motors.

When it is desired to cut off the supply of power to the vehicle motors, the pressure of fluid in the control pipe 13 is again restored to the normal value by operation of the control valve device. Upon the reduction in control pipe pressure in the diaphragm chamber 31, the spring 36 is rendered effective to raise the follower member 32, diaphragm 30 and stem 33 upwardly, thereby causing tilting of the lever 48 in a clockwise direction about the pin 52 until the valve member 39 is returned to its normal position as illustrated, whereupon fluid under pressure is vented from the chamber 70 to the atmosphere by way of the passage 71, port 72, valve channel 42, and atmospheric port 100. Upon the consequent reduction in pressure of fluid in the chamber 70 within the cylinder 63, the spring 92 associated with the propulsion controller 18 is again enabled to act through the medium of the operating member 86 to move the propulsion controller to power-off position, while the movable cylinder 63 is at the same time returned to its intermediate position as shown in Fig. 2. This return movement of the cylinder 63 to its intermediate position will of course cause the lower roller 83 carried by the cylinder to act upwardly against the lever 55, which together with the link 51 and lever 48 will thus be operated to assist in returning the valve member 39 to the coasting position as shown in Fig. 2. It will be understood that the valve member 39 is constructed and arranged to compensate for any slight over-travel, with respect to the normal coasting position, to which it may be subjected in the course of the operation just described.

When it is desired to effect an application of the brakes, the control valve device on the leading vehicle is operated in the usual manner to effect reduction of the pressure of fluid in the control pipe 13 from the normal value to a value corresponding to the selected degree of brake application. As the pressure of fluid in the diaphragm chamber 31 is thus reduced, the diaphragm 30, follower member 32 and stem 33 are shifted upwardly under the force exerted by the coil spring 36, and the lever 48 is consequently tilted in a clockwise direction about the pin 52 and the valve member 39 is moved downwardly toward a brake application position. In so moving, the slide valve member 39 first closes the communication between the port 79 and the exhaust port 101 and then establishes communication between the valve channel 41 and port 79, whereupon fluid under pressure is supplied from the supply pipe 11 through the passage 78 to the chamber 77 within the movable cylinder. The increasing pressure of fluid thus admitted to the chamber 77 quickly causes movement of the cylinder 63 to the right, as viewed in Fig. 2, so that the boss 76 is brought into operative engagement with the lower end of the operating member 93, which is thereby turned about the shaft 94 for actuating the brake controller 21.

As the movable cylinder 63 is thus shifted to the right for operating the brake controller 21 to cause the desired application of the brakes, the roller 83 is carried in the same direction and consequently exerts an upward force against the canted lever 55, so that the link 51 secured to the outer end of the lever is operated to effect counterclockwise tilting of the lever 48 about the pin 49. The supply valve member 39 is thereby shifted upwardly for lapping the port 79 and preventing further supply of fluid under pressure through the passage 78 to the chamber 77. The movable cylinder 63 and the associated elements of the actuator mechanism are thus held in the position assumed in response to the selected degree of reduction in control pipe pressure.

It will be understood that, as hereinbefore explained in connection with operation of the actuator mechanism for controlling the propulsion motors, each of the actuator mechanisms in the train is adapted to effect application of the associated brakes with substantially the same degree of force, and simultaneously with operation of the other actuator mechanisms throughout the train. It will further be apparent that the motorman can graduate the application of the brakes as desired by varying the pressure of fluid in the control pipe, thereby effecting corresponding movement of each of the brake and propulsion control actuator mechanisms in the manner just explained.

From the foregoing description, it will be seen that an actuator device constructed in accordance with my invention may be employed in a brake and propulsion control system of the fluid pressure operated type for effecting definite mechanical movement of either the associated brake controller or propulsion controller as predetermined by control pipe pressure. It will further be noted that my improved control device includes a balanced valve mechanism constructed and arranged to respond to the joint action of a control diapragm and an operating member without interference with the setting of either of said elements.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

A vehicle brake and propulsion remote control actuator comprising, in combination, a piston structure having oppositely disposed abutment portions, an operator cylinder having oppositely disposed pressure chambers and arranged in sliding relation with said abutment portions to have reciprocating movement in accordance with variations in fluid pressure in said chambers, a balanced valve element having a lap position and operable therefrom to supply and release fluid under pressure to and from either of said pressure chambers, a spring, a movable abutment subject to force exerted by said spring and to an opposing control pressure, a yoke element having opposite ends pivotally connected to said movable abutment and to said valve element, respectively, a lever pivotally anchored at one end and having the other end operatively connected in fulcruming relation with said yoke element intermediate its ends, said lever being normally disposed in a canted position relative to the axis of said operator cylinder, and a pair of rollers carried by said reciprocating operator cylinder in engagement with said lever, whereby said valve element is adapted to be shifted to fluid supplying position by said spring pressed movable abutment, and to be returned to lap position by said cylinder and rollers through the medium of said lever, such return movement being free from any opposing force offered by said movable abutment or said spring.

EVERETT P. SEXTON.